US007416575B2

(12) United States Patent
Oh et al.

(10) Patent No.: US 7,416,575 B2
(45) Date of Patent: Aug. 26, 2008

(54) CYCLONE DUST COLLECTING APPARATUS

(75) Inventors: Jang-keun Oh, Gwangju (KR); Chul-heung Kim, Jeollanam-do (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 431 days.

(21) Appl. No.: 11/025,240

(22) Filed: Dec. 29, 2004

(65) Prior Publication Data

US 2006/0037294 A1 Feb. 23, 2006

(30) Foreign Application Priority Data

Aug. 23, 2004 (KR) ...................... 10-2004-0066369

(51) Int. Cl.
*B01D 45/12* (2006.01)

(52) U.S. Cl. ...................... 55/416; 55/459.1; 55/DIG. 3

(58) Field of Classification Search ................... 55/413, 55/414, 416, 459.1, 467, DIG. 3; 15/350, 15/353

See application file for complete search history.

(56) References Cited

U.S. PATENT DOCUMENTS

| | | | | | |
|---|---|---|---|---|---|
| 1,766,237 | A | | 6/1930 | Whitmore | |
| 2,936,043 | A | | 5/1960 | Armstrong et al. | |
| 3,590,558 | A | * | 7/1971 | Fernandes | 55/338 |
| 5,013,342 | A | | 5/1991 | Leussler et al. | |
| 5,180,257 | A | | 1/1993 | Narishima et al. | |
| 5,466,372 | A | | 11/1995 | Jerabek et al. | |
| 6,090,174 | A | * | 7/2000 | Douma et al. | 55/337 |
| 6,679,930 | B1 | | 1/2004 | An et al. | |

FOREIGN PATENT DOCUMENTS

| | | |
|---|---|---|
| DE | 1507817 | 4/1966 |
| DE | 9208156 | 12/1993 |
| EP | 0371531 | 6/1990 |

(Continued)

OTHER PUBLICATIONS

Japanese Office Action.

(Continued)

*Primary Examiner*—Robert A. Hopkins
(74) *Attorney, Agent, or Firm*—Ladas & Parry LLP

(57) ABSTRACT

A cyclone dust collecting apparatus has a cyclone body having an air inlet for drawing in, contaminant-laden air and an air outlet connected with a vacuum suction source. The vacuum provided by the vacuum source draws air from the air outlet, which passes through the cyclone body from the air inlet. As the air flows through the cyclone body, it forms a whirling stream in the cyclone body. The whirling stream creates a centrifugal force on particles that are suspended in the air, which, because of their greater mass, causes them to become separated from air that is drawn out of the whirling stream and into the air outlet by the vacuum source. The air outlet is provided with a passage guide member arranged in the air outlet that reduces the speed of air discharged via the air outlet and also for guiding a flow streamline. The passage guide member reduces a pressure loss by a turbulence flow generated during discharging a cleaned air such that load of vacuum suction resource decreases and power consumption for operating the cyclone dust collecting apparatus can be reduced.

6 Claims, 4 Drawing Sheets

FOREIGN PATENT DOCUMENTS

| | | |
|---|---|---|
| FR | 2655884 | 6/1991 |
| GB | 245636 | 3/1925 |
| GB | 727215 | 6/1953 |
| GB | 2370980 | 7/2002 |
| JP | 52149666 | 12/1977 |
| JP | 56-64761 | 10/1979 |
| JP | 03-270751 | 12/1991 |
| KR | 52149666 | 12/1977 |
| KR | 010014570 | 2/2001 |
| KR | 20010014570 | 2/2001 |
| SU | 187666 | 11/1965 |
| SU | 452365 | 4/1975 |
| WO | WO84/02282 | 6/1984 |
| WO | WO03/068042 | 8/2003 |

OTHER PUBLICATIONS

Chinese Office Action and English translation, Nov. 17, 2006.

Official Action from the German Patent and Trademark Office, Mar. 27, 2007.

* cited by examiner

CYCLONE DUST COLLECTING APPARATUS

CROSS-REFERENCE TO RELATED APPLICATIONS

This application claims the benefit of Korean Patent Application No. 2004-66369 filed on Aug. 23, 2004, in the Korean Intellectual Property Office, the disclosure of which is incorporated herein by reference in its entirety.

FIELD OF THE INVENTION

The present invention relates to a vacuum cleaner, and more particularly to a cyclone dust collecting apparatus for centrifugally separating dusts and contaminants from air.

BACKGROUND OF THE INVENTION

A vacuum cleaner draws in air by driving a motor-driven fan in a main body of a vacuum cleaner. The suction or vacuum created by the fan draw in dusts and contaminant-laden air from an external surface being cleaned.

Prior art vacuum cleaners generally use a dust bag and/or dust filter to collect dust, but recently, a cyclone dust collecting devices have been used to collect dust in a vacuum cleaner because they have an unlimited life span, are easy to empty and easy to clean.

Korean Utility Model Application No. 1993-4891 entitled 'Vacuum cleaner having a cyclone' and Korean Patent Application No. 1993-5099 entitled 'Vacuum cleaner' are examples of a vacuum cleaner having a cyclone dust collecting apparatus. The cyclone dust collecting apparatus comprises a cyclone body, which includes an air inlet and an air outlet. The cyclone body forms a whirling stream with contaminant-laden air drawn through the air inlet, into the cyclone body where particles are centrifugally separated from the drawn-in air. Cleaned air is discharged via the air outlet to the outside.

As is known, the airflow that exits from the air outlet is turbulent due to inertial forces of the whirling stream into the air outlet. The turbulent air current flowing through the air outlet hits the inside wall of the air outlet, or it collides with newly cleaned air flowing from the cyclone body such that air pressure and volume flowing through the air outlet can lost at the air outlet. The pressure loss at the air outlet increases the load on the vacuum source in a vacuum cleaner. Electrical power consumption therefore increases.

If the air outlet is smaller than the cyclone body in cross-section, the speed of cleaned air flowing from the air outlet will increase accordingly. Unfortunately, an air speed increase at the outlet will cause noise to increase such that noise abatement might be required.

SUMMARY OF THE INVENTION

The present invention has been conceived to solve the above-mentioned problems occurring in the prior art, and an aspect of the present invention is to provide an improved cyclone dust collecting apparatus for use in a vacuum cleaner or other particle separation devices, having an improved ability to collect minute dust particles with reduced wind noise.

In order to achieve the above aspects, there is provided a cyclone dust collecting apparatus in a vacuum cleaner or other particle separation device comprising a cyclone body having an air inlet for drawing in contaminant-laden air and an air outlet connected with a vacuum suction resource. The cyclone body forms a whirling stream with respect to air drawn into the air outlet; and a passage guide member arranged in the air outlet. The cyclone body reduces the exit speed of cleaned air discharged via the air outlet and creates a streamlined flow of cleaned air.

The passage guide member comprises a plurality of guide ribs that extend into the air stream, forming an air passage in the center of the air outlet. The guide ribs may be arranged at a spaced distance from an entrance of the air outlet. The passage guide member may also protrude from an inner surface of the air outlet.

The guide ribs may be arranged at an interval of 90 degrees around the circumference of the air outlet. The guide ribs each may be formed to have a curved part configured to face an entrance of the air outlet; and a linear part that extends away from the curved part toward the exit of the air outlet. The curved parts of the opposite guide ribs may be bent in opposite directions.

The passage guide member may also comprise an S-shaped guide rib dividing the air outlet stream into two parts that are separated from each other by the S-shaped guide rib. The passage guide member may also comprise two S-shaped guide ribs arranged on each other for dividing the air outlet into two parts in cross-section.

The two S-shaped guide ribs may be arranged to be traverse to each other. The passage guide member may comprise guide ribs split in the middle into two ends, which curve in opposite directions.

As described above, the passage guide member reduces turbulence in the air flowing from the discharge of the cyclone body. Reduced turbulence in the discharged air stream will reduce power losses therefore, the load on a vacuum suction source in a vacuum cleaner using the passage guide member with a cyclone dust collector will decrease. Further, since the passage guide member reduces the speed of air drawn through the air outlet, the noise generated in the air outlet is also reduced.

BRIEF DESCRIPTION OF THE DRAWINGS

The above and other aspects, features and advantages of the present invention will be more apparent from the following detailed description taken with reference to the accompanying drawings, in which.

DETAILED DESCRIPTION OF THE PREFERRED EMBODIMENTS

Figure 1:
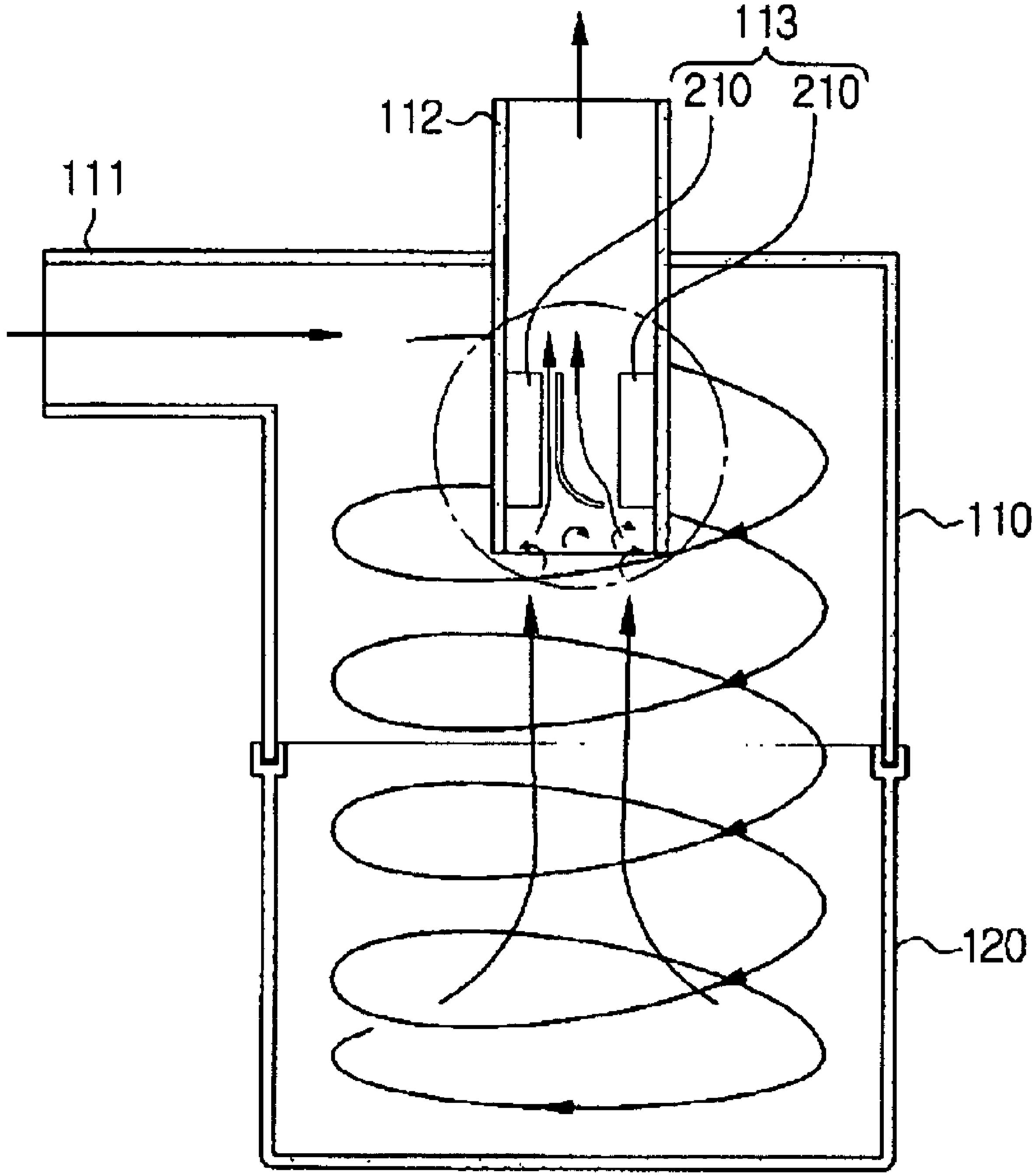
FIG. 1 is a cross-sectional view of the preferred embodiment of a cyclone dust collecting apparatus.

Certain embodiments of the present invention will be described in greater detail with reference to the accompanying drawings.

In the following description, drawing reference numerals are used for the same elements in different drawings. The embodiments described herein are only examples and not intended to limit the invention disclosed herein. Rather, the invention disclosed herein is set forth in the appurtenant claims. Also, well-known functions and structures are not described in detail since they would obscure the invention in unnecessary detail.

FIG. 1 is a cross-sectional view of the preferred embodiment of a cyclone dust collecting apparatus. The cyclone dust collecting apparatus comprises a cyclone vessel or body 110 and a passage guide member 113. An air inlet 111 provides a passageway for drawing in contaminant-laden air. An air outlet 112 is connected to a vacuum suction resource (not shown), which draws air through the cyclone body 110 causing the air drawn-in through the air inlet 111 to form a whirling stream or cyclone as shown in FIG. 1. The cyclonic airflow centrifugally separates contaminants from the air.

A contaminants collecting receptacle 120 can be detachably mounted to the bottom of the cyclone body 110, for collecting the centrifugally separated contaminants.

The passage guide member 113 is mounted in the air outlet 112. It reduces turbulence in the air flowing through the air outlet 112 and decreases the speed of air drawn through the air outlet 112 by which the noise generated in the air outlet 112 is reduced and the amount of power required to move a specified volume air in a specified amount of time is also reduced.

The passage guide member 113 may be mounted into the air outlet 112 tube or pipe as a separate structural member. It may also be integrally formed with the air outlet 112, such as by molding. Regardless of how it is formed or mounted into the outlet air stream, the passage guide member 113, protrudes into the air stream that flows through the air outlet 112.

The optimum configuration of the passage guide member 113 (i.e., its geometry, size, shape, construction, surface roughness, etc.) is best determined experimentally because the ability of the passage guide member 113 to suppress turbulence will depend on several things, including, but not limited to: the air outlet 112 cross sectional shape and its cross-sectional area. The ability to suppress turbulence will also depend on the required airflow rate through the air outlet 112. Other factors affecting the passage guide member's ability to suppress turbulence include its shape, how it's installed (Are fillets and rounds used to eliminate interior and exterior corners?) and even the roughness of its surface.

The passage guide member 113 according to a first preferred embodiment of the present invention comprises four guide ribs 210 that each protrude from the inner surface of the air outlet 112. The four guide ribs 210 in this embodiment form an air passage 211 as shown in FIGS. 2 to 4.

Figure 2:
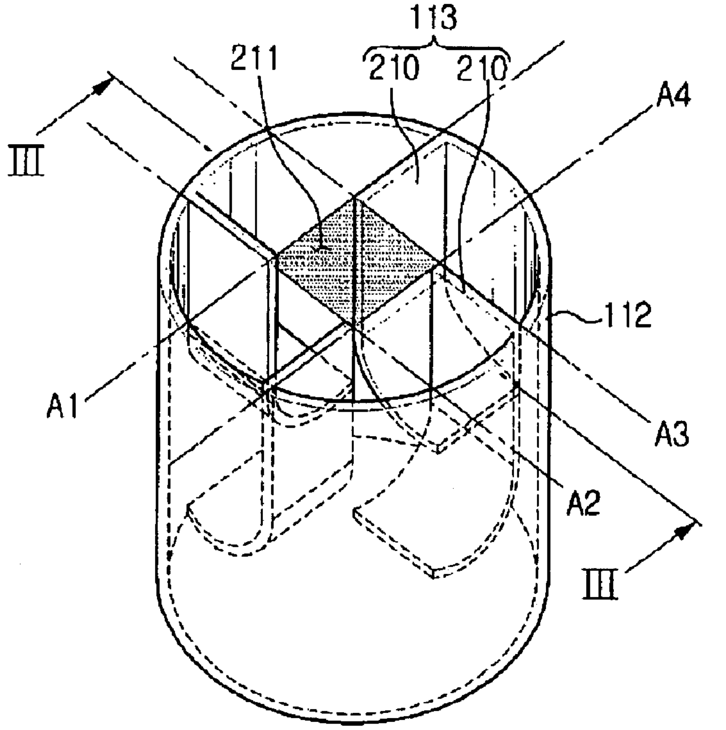
FIG. 2 is a perspective view of a passage guide member of an air outlet of the cyclone dust collecting apparatus shown in FIG. 1.
Figure 3:
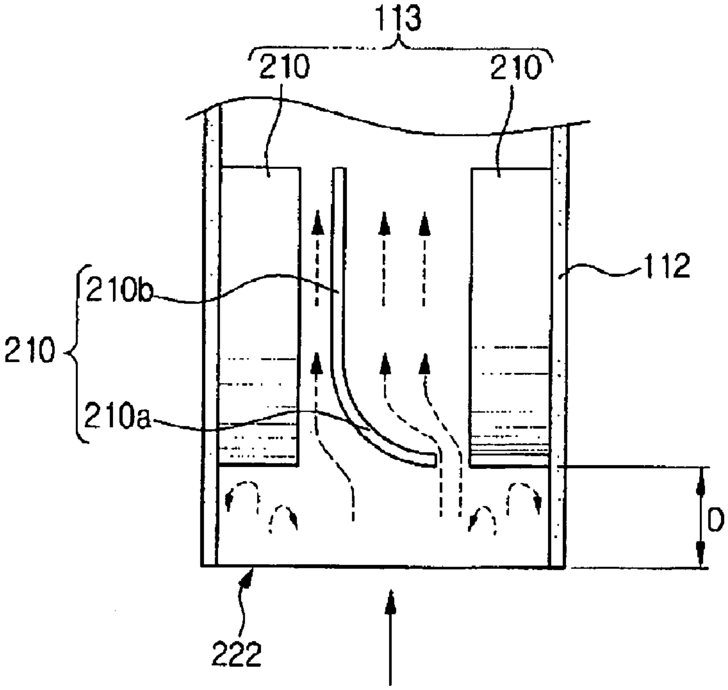
FIG. 3 is a longitudinal-sectional view of FIG. 2.
Figure 4:
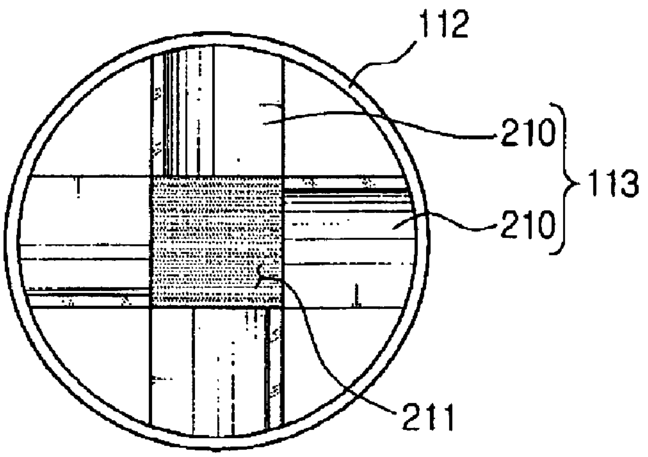
FIG. 4 is a bottom view of FIG. 2.

The guide ribs 210 shown in FIGS. 2 to 4 each comprise a curved part 210*a* and a linear part 210*b* as shown in FIG. 3. The ribs are installed in the air outlet 112 so that the curved part 210*a* faces toward the entrance end of the air outlet 112.

The curved part 210*a* presents a relatively wide and flat surface against which air flowing through the air outlet 112 will impinge, thereby reducing the speed of the air drawn into the air outlet 112. The curved part 210*a* of the guide ribs route the flowing air into the linear part 210*b*.

The linear part 210*b* extends from the curved part 210*a* toward an exit end of the air outlet 112. The linear part 210*b* streamlines air guided from the curved part 210*a*, thereby reducing turbulence in the flow and tending to make the flow laminar or more nearly laminar flow.

The four guide ribs 210 are evenly spaced around the circular-cross sectioned air outlet 112. They are therefore considered to be "configured" at 90° intervals with respect to each other and a central axis of the air outlet 112 around which they are evenly spaced. The curved parts 210*a* of the opposite guide ribs 210 are bent in opposite directions as shown in FIG. 2.

In accordance with the above structure, the curved parts 210*a* tend to form a whirling or rotating air stream and smoothly guide the rotating air into the air outlet 112 to reduce rotation of cleaned air. They also partially block the drawn-in air pathway by which the air current speed as it exits the air outlet 112 is reduced. A reduced exit air speed through and from the air output 112 results in reduced noise being generated at the air outlet 112.

As shown in FIG. 3, the guide ribs 210 may be mounted away from the air outlet 112 entrance. In FIG. 3, the guide ribs are removed from the air outlet entrance 222 by a distance D.

The air passage 211 may be configured in a substantially center part of the air outlet 112 as shown in FIGS. 2 and 4. In the embodiment shown in FIGS. 2 and 4, the four guide ribs 210 each have substantially the same width. The imaginary lines A1, A2, A3 and A4 shown in FIG. 2, extend across the width of each of four guide ribs 210 in the air outlet 112. Their mutual intersection defines the cross sectional area of the air passage 211, which is marked in FIG. 2 by hatching.

The cleaned air discharged via the air passage 211 flows from the air outlet 112 unhindered. Thereafter, the main air stream flows to the vacuum source faster than it would if it were guided by the guide ribs 210. Accordingly, the guide ribs 210 form an air current streamlined in an area that is adjacent to the inner surface of the air outlet 112 such that a turbulent stream can be prevented which is generated when the main stream discharged via the air passage 211 and the inner surface of the air outlet 112 are collided each other.

To confirm the effect of a passage guide member having the guide ribs 210, an experiment was performed using eight types of dusts, each averaging in particle size of 7.5 μm and a discharge speed of 20 m/s when discharged via the air outlet 112. When the passage guide member 113 is structured or "configured" to have four guide ribs 210 as shown in FIGS. 2 to 4, pressure loss is reduced approximately by 7~13%. Furthermore, it was experimentally determined that air flow in the cyclone body 110 is not affected by the guide ribs 210 presence or absence.

That there are four guide ribs 210 depicted in FIGS. 2 to 4 should not be construed as a requirement or limitation. Two, three or several guide ribs can be arranged at a spaced-apart distance from each other in the air outlet 112.

Figure 5:
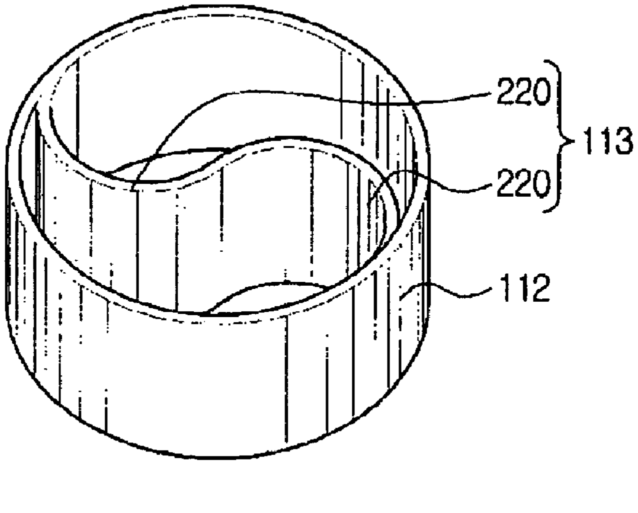
FIG. 5 is a perspective view of an air outlet having a passage guide member which is an essential part for a cyclone collecting apparatus according to the second embodiment of the present invention.

The passage guide member 113 according to the second embodiment may be an S-shaped guide rib 220 as shown in FIG. 5. Both ends of the S-shaped guide rib 220 are attached to the air outlet 112 to divide the air outlet 112 into two substantially equal-area parts, when viewed from an end of the air outlet 112, in cross-section.

Figure 6:
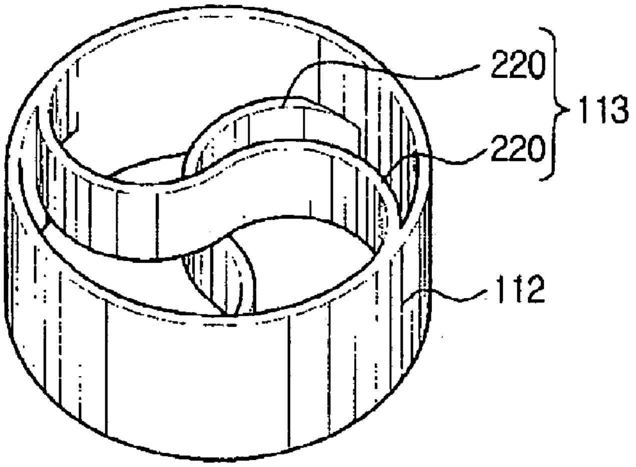
FIG. 6 is a perspective view of an air outlet having a passage guide member which is an essential part for a cyclone collecting apparatus according to the third embodiment of the present invention.

In yet another alternate embodiment, the passage guide member 113 may be two or more S-shaped guide ribs 220, each being overlaid on the other. as shown in FIG. 6. In yet another alternate embodiment (not shown) two or more S-shaped guide ribs can be interleaved into each other although the S-shaped guide rib 220 are preferably arranged such that one traverses the other.

Figure 7:
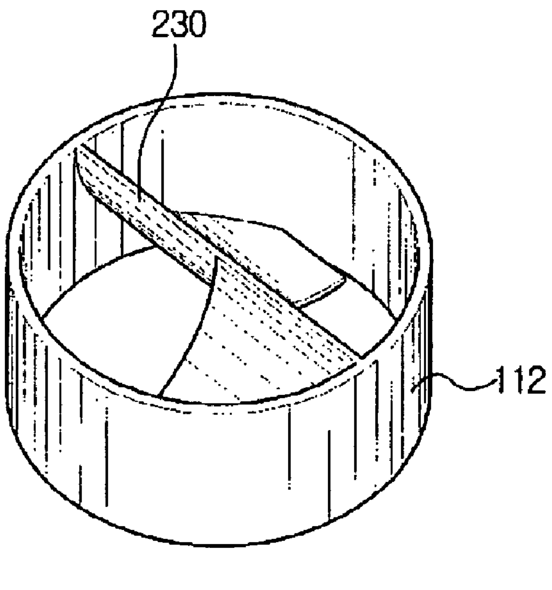
FIG. 7 is a perspective view of an air outlet having a passage guide member which is an essential part for a cyclone collecting apparatus according to the fourth embodiment of the present invention.

The passage guide member according to a fourth embodiment of the present invention may be as shown in FIG. 7, wherein two guide ribs 230 are split in the middle into two parts curved in opposite directions.

Whether the passage guide members 113 are as set forth above in any of the embodiments and equivalents thereof, the inclusion of passage guide members 113 in the exit air stream that flows through the air outlet 112 will reduce or eliminate turbulence such that pressure loss in the air outlet 112 can be reduced. The speed of air drawn into the air outlet 112 therefore decreases, reducing the amount of noise that is generated.

As described above, a passage guide member 113 reduces turbulence, and reduces pressure loss caused by a turbulent flow generated during the discharge of cleaned air. The load on the vacuum source is therefore reduced, thereby reducing power consumption for operating the cyclone dust collecting apparatus.

Further, the passage guide member reduces the current speed of air drawn into the air outlet so that noise generated in the air outlet can decreases.

The foregoing embodiment and advantages are merely exemplary and are not to be construed as limiting the present invention.

Those of ordinary skill in the art will appreciate that the cyclone dust collecting apparatus described above can be readily used in many applications.

The cyclone dust collecting apparatus can certainly be used in upright and canister vacuum cleaners, such as those mentioned in the prior art patents set forth above. Since vacuum cleaners are known to require a vacuum source, such as a motor driven fan, a hose and a dust collection unit that is operated over a floor other surface being cleaned, further disclosure of such well-known vacuum cleaner components is omitted herefrom for brevity.

The present teaching can also be used to separate particles in other air and gas filtration systems in which small particles suspended in air or other gases can be centrifugally separated. Therefore, the appurtenant claims should not be construed to be limited to only vacuum cleaner applications but can be used to separate particles suspended in air and other gases and should be broadly construed as a gas-suspended particle separator.

What is claimed is:

1. A cyclone dust collecting apparatus comprising:

a cyclone body having an air inlet for drawing contaminant-laden air and an air outlet connected with a vacuum suction resource, the cyclone body forming a whirling stream with respect to an air drawing into the air outlet; and a passage guide member arranged in the air outlet, for reducing a current speed of cleaned air being discharged via the air outlet and also for guiding a streamline flow of the cleaned air, wherein the air outlet further comprises: an entrance end, proximate to the whirling stream and the passage guide member is spaced away from the air outlet entrance end; and wherein the passage guide member extends into the air outlet from an inner surface of the air outlet and said guide member has a cross sectional shape that is substantially the same shape as the letter J, the curved part of which faces the entrance end of the air outlet and the straight part of the passage guide member extends away from the entrance end of the air outlet.

2. The apparatus according to claim 1, further comprising a plurality of J-shaped guide ribs forming an air passage in the center of the air outlet.

3. The apparatus according to claim 2, wherein the plurality of substantially J-shaped ribs are evenly spaced around the inner surface of the air outlet.

4. The apparatus according to claim 3, wherein the substantially J-shaped guide ribs are arranged at intervals of 90 degrees.

5. The apparatus according to claim 4, wherein the substantially J-shaped guide ribs each comprises:

a curve part configured to face an entrance of the air outlet; and a linear part extended from the curve part to an exit of the air outlet, the curve part and the linear part having uniform widths such that each of them extends from the inner surface of the air outlet, to the center of the air outlet.

6. The apparatus according to claim 5, wherein the curve parts of the substantially J-shaped opposite guide ribs are bent to opposite directions, respectively.

* * * * *